No. 718,677. PATENTED JAN. 20, 1903.
A. THEYSKENS.
MANUFACTURE OF WHEELS AND PULLEYS.
APPLICATION FILED AUG. 2, 1900.
NO MODEL. 2 SHEETS—SHEET 1.
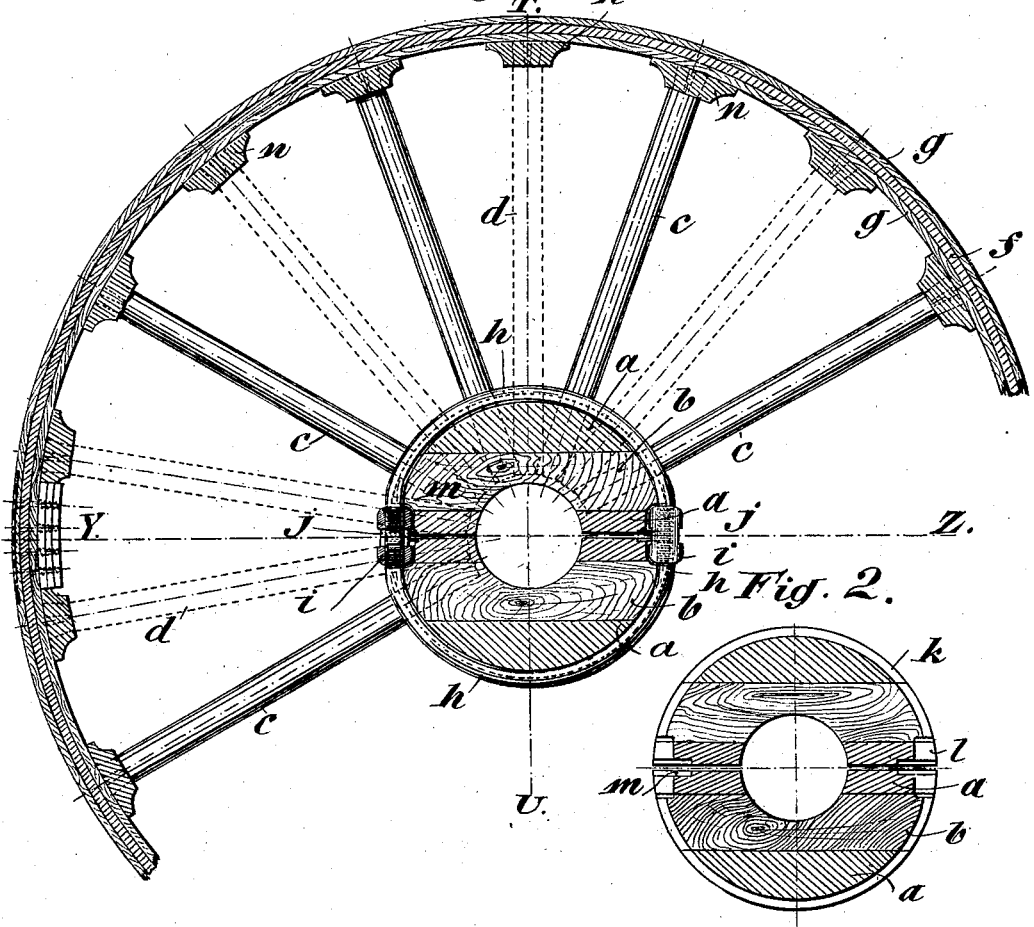
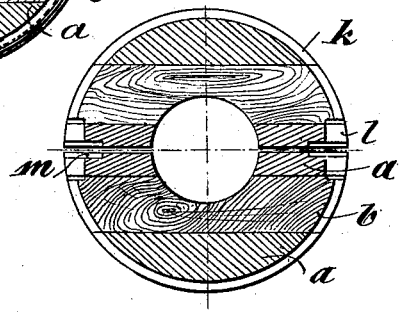
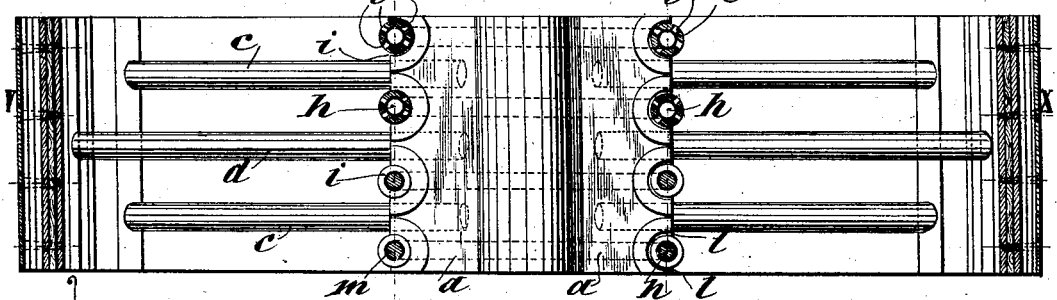

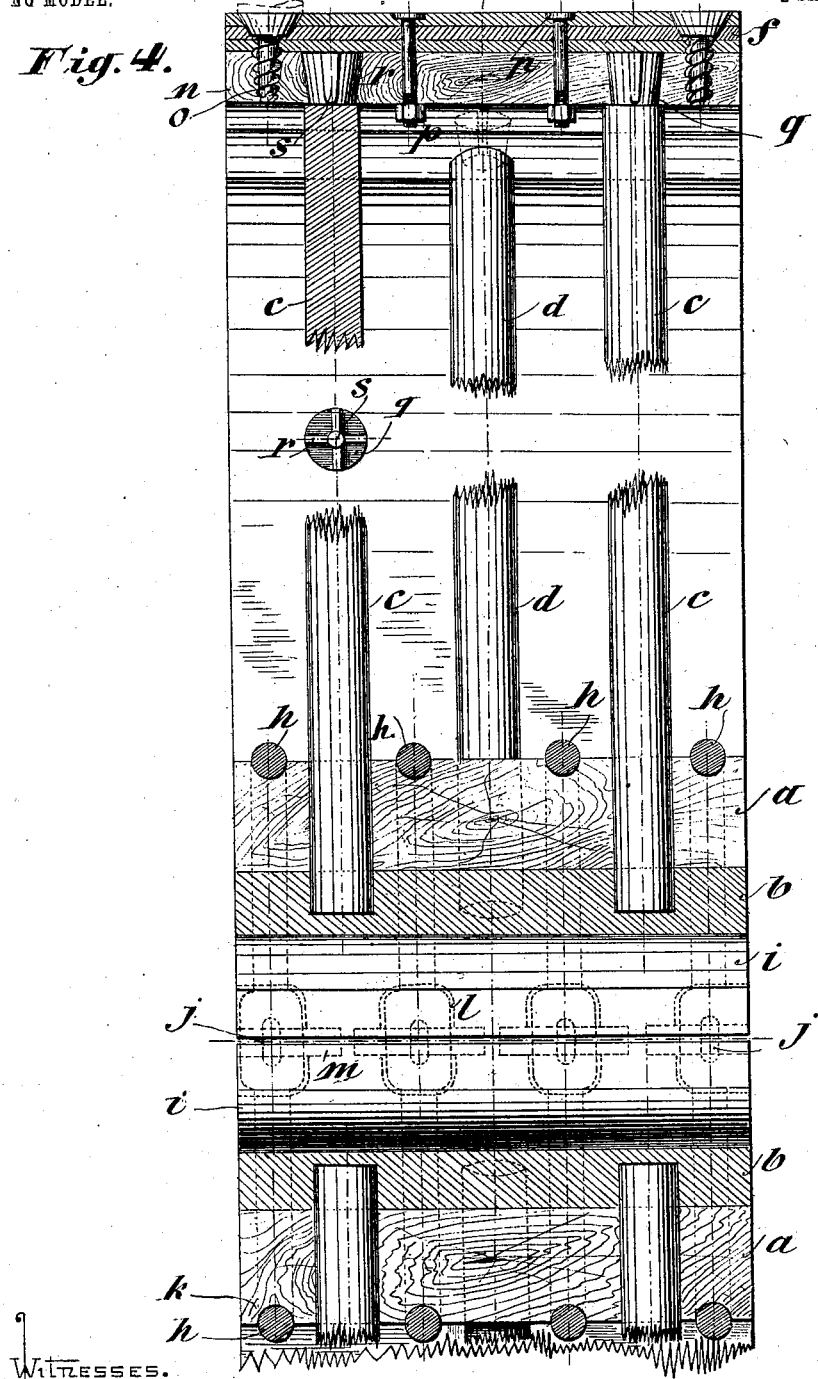

UNITED STATES PATENT OFFICE.

ALPHONSE THEYSKENS, OF TESTELT, BELGIUM.

MANUFACTURE OF WHEELS AND PULLEYS.

SPECIFICATION forming part of Letters Patent No. 718,677, dated January 20, 1903.

Application filed August 2, 1900. Serial No. 25,618. (No model.)

*To all whom it may concern:*

Be it known that I, ALPHONSE THEYSKENS, engineer, a citizen of Belgium, residing at Testelt, in the Kingdom of Belgium, have invented certain new and useful Improvements in the Manufacture of Wheels and Pulleys, of which the following is a clear description.

This invention relates to the manufacture of pulleys, and it has reference particularly to that class of pulleys which are formed in two sections suitably coupled together.

In the accompanying drawings, wherein corresponding letters of reference designate like parts, my invention is fully illustrated.

In said drawings, Figure 1 is a sectional view on the line V X of Fig. 3, a portion of the pulley being broken away. Fig. 2 is a transverse sectional view of the nave or hub of the pulley. Fig. 3 is a sectional view on the line Y Z of Fig. 1; and Fig. 4 is a sectional view, somewhat enlarged, on the line T U of Fig. 1.

The hub or nave of the pulley consists of several sections of wood $a$ and $b$, which are glued or otherwise secured together, said sections being arranged with their adjacent faces disposed in planes parallel with the axis of the pulley. The hub or nave is of cylindrical form, the corresponding sections of wood on opposite sides thereof being shaped substantially alike. I prefer that there be five layers of sections, the innermost one of which, since it is alined with the bore of the pulley, is divided centrally by said bore.

For the purpose of imparting strength and stability and for enhancing the equilibrium or balance of the pulley and also to reduce the possibility of the pulley being thrown out of true by reason of the spokes not being embedded in the nave or hub with uniform firmness I arrange the sections of wood which compose the hub or nave with their grain or fibers disposed crosswise or transversely to each other.

The pulley being one of the split type, the hub or nave is divided longitudinally into equal portions, the plane of division being in the central plane of the innermost section, which, besides being divided by the bore into two portions, as above described, is thus subdivided.

The hub or nave is surrounded by circumferential channels $k$, in which seat pairs of semicircular hoops $h$, which are provided at their ends with reverse screw-threads that are adapted to receive couplings $i$, whereby said hoops are united to form straps for holding the two members of the hub or nave together and which may be tightened up, so that said members may be securely held together. In order to accommodate the couplings $i$, which, it should be remarked, are disposed in alinement with the innermost section of the hub, said section is provided on opposite sides with recesses $l$, alined with the channels $k$. It will be understood that there may be as many of these straps as the necessities of the case demand.

$c\ d$ designate the spokes of the pulley, the same being radially disposed and having their inner ends embedded in suitable openings formed in the hub for their reception. They should, of course, snugly fit in these openings. These spokes may vary in number according to the size of the pulley and to the degree of stability required therein. It is preferred that they be arranged in sets of any number, though it is preferred that all the sets should not be alined with each other in the direction of the axis of the pulley.

The rim $f$ may be composed of a single layer of bent wood; but it is preferred that it be composed of more than one layer, the said layers having their fibers disposed at right angles to each other—*i. e.*, those of every alternate layer being parallel with the axis of the pulley, while those of the remainder are disposed crosswise with reference to the axis of the pulley. $t\ g$ designate some of these layers. Said layers may be secured together in any desired manner.

Although the outer ends of the spokes may be connected to the rim in any well-known manner, it is preferred that plates $m$, which are preferably secured to the inner surface of the rim by means of bolts $p$ or screws $o$, made of wood and dipped in glue before being set in place, be employed for this purpose. Said plates each have conical orifices $u$ corresponding in number to the number of the sets of spokes the ends of which they are adapted to receive. The ends of the spokes are provided with extensions $v$, having cross-cut notches $r$ cut into them from their free ends, into which notches, after the extension of each spoke has been fitted into the corresponding orifice of the plate $n$, wedges $s$ may be driven to spread the extensions, giving them the conical form of the orifices, so that any tendency toward separation of the plate and spokes is thus resisted. It should be remarked that the rim is divided in the plane in which the hub is divided. The sections thus formed in the rim may be secured together in any well-known manner.

Having thus fully described my invention, what I claim as new, and desire to secure by Letters Patent, is—

In a composite pulley, the combination of a nave or hub consisting of two corresponding sections each comprising wooden pieces having their grains arranged relatively at right angles to each other, sectional bands surrounding said hub-sections and having binding devices securing their sections together, spokes projecting into said hub-sections, some of said spokes penetrating the several pieces of each section, plates having conical holes receiving the free ends of said spokes, wedges driven into said ends of the spokes and spreading the same to fit said holes, and a rim secured to said plates, substantially as described.

In testimony whereof I have signed this specification in the presence of two subscribing witnesses.

ALPHONSE THEYSKENS.

Witnesses:
ALBERT SCHWEIGERT,
J. P. H. POHLEN.